US008846856B2

United States Patent
Marks

(10) Patent No.: US 8,846,856 B2
(45) Date of Patent: *Sep. 30, 2014

(54) HYDROXYL-FUNCTIONAL POLYETHERS AND A PREPARATION PROCESS THEREFOR

(75) Inventor: Maurice J. Marks, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 236 days.

This patent is subject to a terminal disclaimer.

(21) Appl. No.: 13/131,713

(22) PCT Filed: Nov. 23, 2009

(86) PCT No.: PCT/US2009/065436
§ 371 (c)(1),
(2), (4) Date: May 27, 2011

(87) PCT Pub. No.: WO2010/077484
PCT Pub. Date: Jul. 8, 2010

(65) Prior Publication Data
US 2011/0245434 A1 Oct. 6, 2011

Related U.S. Application Data

(60) Provisional application No. 61/141,465, filed on Dec. 30, 2008.

(51) Int. Cl.
*C08G 65/04* (2006.01)
*C08G 59/02* (2006.01)
*C08G 65/26* (2006.01)
*C08G 59/62* (2006.01)

(52) U.S. Cl.
CPC .......... *C08G 59/027* (2013.01); *C08G 65/2612* (2013.01); *C08G 59/02* (2013.01); *C08G 59/621* (2013.01)
USPC ........... 528/421; 525/407; 525/409; 525/523; 525/534; 525/481; 528/406; 528/418; 528/419; 528/87

(58) Field of Classification Search
USPC .......... 525/407, 409, 523, 534, 481; 528/406, 528/418, 421, 87
See application file for complete search history.

(56) References Cited

U.S. PATENT DOCUMENTS

| 2,456,408 | A | | 12/1948 | Greenlee | |
|---|---|---|---|---|---|
| 2,924,580 | A | * | 2/1960 | Phillips et al. | 528/408 |
| 4,451,550 | A | * | 5/1984 | Bennett et al. | 430/176 |
| 4,764,580 | A | * | 8/1988 | Martin et al. | 528/98 |
| 5,962,547 | A | * | 10/1999 | Nikolic et al. | 522/170 |
| 6,455,116 | B1 | | 9/2002 | Xia et al. | |

FOREIGN PATENT DOCUMENTS

| GB | 199230 | | 6/1923 |
|---|---|---|---|
| GB | 980509 | | 7/1961 |
| GB | 980509 | * | 1/1965 |
| JP | 4168112 | | 6/1992 |

OTHER PUBLICATIONS

Pham, H.Q. and Marks, M.J., Ullmann's Encyclopedia of Industrial Chemistry, 2005, p. 45.
U.S. Appl. No. 61/141,457, filed Dec. 30, 2008, Marks et al.
Gotro, J. and Prime, R. B. 2004. Thermosets. Encyclopedia Of Polymer Science and Technology. pp. 207-221.

* cited by examiner

*Primary Examiner* — Robert C Boyle

(57) ABSTRACT

A novel hydroxyl-functional polyether derived from the reaction of (a) a divinylarene dioxide, particularly a divinylarene dioxide derived from divinylbenzene such as divinylbenzene dioxide (DVBDO); and (b) a diphenol; wherein the reaction product is thermally stable and exhibits an absence of self-polymerization (crosslinking or gelling) upon heating at elevated temperatures. The novel hydroxyl-functional polyether offers improved properties compared to known hydroxyl-functional polyethers such as solid epoxy resins, phenolic epoxy resins (hardeners), and poly(hydroxyl ethers).

8 Claims, No Drawings

HYDROXYL-FUNCTIONAL POLYETHERS AND A PREPARATION PROCESS THEREFOR

CROSS-REFERENCE TO RELATED APPLICATIONS

This application is a National Stage application under 35 U.S.C. §371 of PCT/US2009/65436, filed on Nov. 23, 2009 and published as WO 2010/077484 on Jul. 8, 2010, which claims the benefit of U.S. Provisional Application Ser. No. 61/141,465 filed Dec. 30, 2008, the entire contents of which are incorporated herein by reference in its entirety.

BACKGROUND OF THE INVENTION

1. Field of the Invention

The present invention is related to novel hydroxyl-functional polyethers based on divinylarene dioxides and a process for preparing said novel hydroxyl-functional polyethers.

2. Description of Background and Related Art

Hydroxyl-functional polyethers are components used in various thermoplastic and thermoset formulations, wherein such formulations, in turn, are useful in a wide variety of applications such as thermoplastic and thermoset compositions and articles. Typically, previously known hydroxyl-functional polyethers are prepared by reacting conventional epoxy resins and diphenols. For example, polyethers prepared using an equivalent excess of epoxy resin with diphenols are known as solid epoxy resins (SER) such as those SERs described in U.S. Pat. No. 2,456,408; polyethers prepared by an equivalent excess of diphenol with epoxy resins are known as phenolic epoxy resins (PER) such as those PERs described in "Epoxy Resins", H. Q. Pham and M. J. Marks, Ullmann's Encyclopedia of Industrial Chemistry, 2005, p. 45; and polyethers prepared using approximately equal equivalents of epoxy resins and diphenols are known as poly(hydroxylethers) (PHE) such as those PHEs described in British Patent No. 980509.

It is always a challenge in the field to develop hydroxyl-functional polyethers offering improved properties, such as greater thermal resistance; and which can be used in a wide variety of applications. Therefore, it would desirable to provide hydroxyl-functional polyethers having improved properties such as improved heat resistance while maintaining the same molecular weight of the polyether product; and/or it would desirable to provide hydroxyl-functional polyethers having a lower viscosity while maintaining the same heat resistance of the polyether product, when compared to known analogs of such polyethers.

SUMMARY OF THE INVENTION

One embodiment of the present invention is directed to a hydroxyl-functional polyether composition which is the reaction product of (a) a divinylarene dioxide as a comonomer, for example a divinylbenzene dioxide (DVBDO); and (b) a diphenol as the other comonomer, for example bisphenol A. The novel hydroxyl-functional polyether compositions of the present invention offer improved properties compared to known hydroxyl-functional polyethers.

Another embodiment of the present invention is directed to a process of manufacturing a hydroxyl-functional polyether composition by reacting (a) a divinylarene dioxide as a comonomer, for example DVBDO; and (b) a diphenol as the other comonomer, for example bisphenol A.

DETAILED DESCRIPTION OF THE INVENTION

The present invention is not limited to the specific embodiments described below, but rather; the present invention includes all alternatives, modifications, and equivalents falling within the true scope of the appended claims.

The hydroxyl-functional polyether composition of the present invention, in general, comprises the reaction product of (a) a divinylarene dioxide; and (b) a diphenol.

The hydroxyl-functional polyether composition of the present invention may be illustrated generally by the following general chemical Structure I:

Structure I

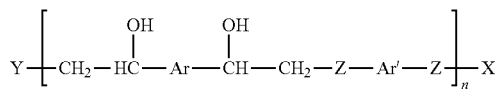

wherein Ar is an arene fragment including for example those derived from benzene, naphthalene, dihydronaphthalene, tetrahydronaphthalene, biphenyl, and diphenylether; Ar' is an aromatic fragment including for example those derived from benzene, naphthalene, biphenyl, methylenediphenyl, and isopropylidenediphenyl; Z is oxygen, X and Y are end groups which depend on the stoichiometry and presence of optional monofunctional co-reactants such as described below; and "n" is the degree of polymerization of the polyether and ranges from about 1 to about 1000, preferably from about 1 to about 100, and most preferably from about 1 to about 50.

The hydroxyl-functional polyether compositions of the present invention may comprise polymeric compositions including for example solid epoxy resins (SER), phenolic epoxy resins (PER), and poly(hydroxyl ethers) (PHE). In one embodiment, for example, SERs of the present invention as illustrated in Structure I above include compositions wherein X and Y are epoxy-functional residues from a partially reacted divinylarene dioxide.

In another embodiment, for example, PERs of the present invention as illustrated in Structure I above include compositions wherein X and Y are phenolic-functional residues from a partially reacted diphenol.

In yet another embodiment, for example, PHEs of the present invention as illustrated in Structure I above include compositions wherein X and Y can represent either of the above previously mentioned residues for SERs and/or PERs.

When a monofunctional component is added to the preparation of any of the SERs, PERs and/or PHEs compositions above, X and Y are residues of the reacted monofunctional component. In cases where the monofunctional component only partially caps the resultant polymer, then X or Y of Structure I represent either an epoxy-functional and/or a phenolic-functional residue.

Divinylarene dioxides, particularly those derived from divinylbenzene such as for example divinylbenzene dioxide (DVBDO), are class of diepoxides which have a relatively low liquid viscosity but a higher rigidity than conventional epoxy resins.

The divinylarene dioxide useful in the present invention may comprise, for example, any substituted or unsubstituted arene nucleus bearing two vinyl groups in any ring position. The arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

In one embodiment, the divinylarene dioxide used in the present invention may be produced, for example, by the process described in U.S. Patent Application Ser. No. 61/141,457, filed of even date herewith, by Marks et al., incorporated herein by reference.

The divinylarene dioxide used for preparing the composition of the present invention may be illustrated generally by general chemical Structures II-V as follows:

Structure II

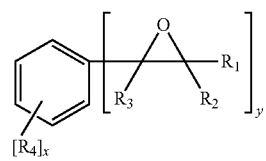

Structure III

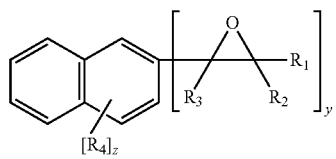

Structure IV

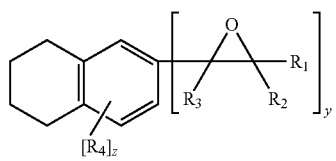

Structure V

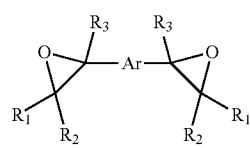

In the above Structures II, III, IV and V of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

The divinylarene dioxide component useful in the present invention may include for example divinylbenzene dioxide, divinylnaphthalene dioxide, divinylbiphenyl dioxide, divinyldiphenylether dioxide, and mixtures thereof.

Structure VI below illustrates an embodiment of a preferred chemical structure of the DVBDO useful in the present invention:

Structure VI

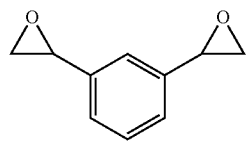

Structure VII below illustrates another embodiment of a preferred chemical structure of the DVBDO useful in the present invention:

Structure VII

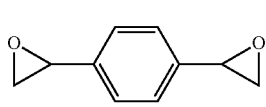

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures V and VII above show the meta (1,3-DVBDO) and para isomers of DVBDO, respectively. The ortho isomer is rare; and usually DVBDO is mostly produced generally in a range of from about 9:1 to about 1:9 ratio of meta (Structure VI) to para (Structure VII) isomers. The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In yet another embodiment of the present invention, the divinylarene dioxide may contain quantities (such as for example less than about 20 weight percent) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of the pure compound.

In one embodiment, the divinylarene dioxide useful in the present invention comprises, for example, divinylbenzene dioxide (DVBDO), a low viscosity liquid epoxy resin. The viscosity of the divinylarene dioxide used in the process of the present invention ranges generally from about 10 centipoise (mPa-s) to about 100 mPa-s, preferably from about 10 mPa-s to about 50 mPa-s, and more preferably from about 10 mPa-s to about 25 mPa-s at 25° C.

The concentration of the divinylarene oxide used in the present invention may range generally from about 1 weight percent (wt %) to about 99 wt %, preferably from about 2 wt % to about 98 wt %, and more preferably from about 5 wt % to about 95 wt %.

One of the advantageous properties of the divinylarene dioxides useful in the present invention is their thermal stability which allows their use in formulations or processing at moderate temperatures (for example, at from about 100° C. to about 200° C.) for up to several hours (for example, for at least 2 hours) without oligomerization or homopolymerization. Oligomerization or homopolymerization during formulation or processing is evident by a substantial increase in viscosity or gelling (crosslinking). The divinylarene dioxides useful in the present invention have sufficient thermal stability such that the divinylarene dioxides do not experience a substantial increase in viscosity or gelling during formulation or processing at moderate temperatures.

Another one of the advantageous properties of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from about 6 to about 10, preferably from about 6 to about 9, and more preferably from about 6 to about 8 rotational degrees of freedom.

The diphenols useful in the present invention may include any of the diphenols well-known in the art, such as bisphenol A, bisphenol F, halogenated bisphenols such as tetrabromobisphenol A, biphenol, thiodiphenol, dinaphthol; and mixtures thereof. Preferably, the diphenols used in the present invention may include bisphenol A, bisphenol F, halogenated bisphenols such as tetrabromobisphenol, and mixtures thereof.

The concentration of the diphenols used in the present invention may range generally from about 99 wt % to about 1 wt %, preferably from about 98 wt % to about 2 wt %, and more preferably from about 95 wt % to about 5 wt %. In one embodiment, the concentration of the diphenol is present in the composition in a stoichiometric ratio in terms of epoxy to phenolic of less than 1.0, preferably less than 0.99 and more preferably less than 0.9; and in other embodiments, greater than 0.01, preferably greater than 0.02 and more preferably greater than 0.1. In general, the ratio in terms of epoxy to phenolic equivalents of the composition of the present invention may be from greater than about 0.01 to less than about 1.0; preferably from greater than about 0.02 to less than about 0.99; and more preferably from greater than about 0.1 to less than about 0.9. In one embodiment, the ratio of epoxy to phenolic equivalents is from about 0.3 to about 0.7.

In preparing the compositions of the present invention, a catalyst may optionally be used. Catalysts used to prepare the compositions of the present invention may be selected, for example, from one or more of, an alkali metal salt, an alkaline earth metal salt, a tertiary amine, a quaternary ammonium salt, a quaternary phosphonium salt, and the like, and mixtures thereof. Preferably, the catalyst used in the present invention is ethyltriphenylphosphonium acetate-acetic acid complex or 2-phenylimidazole; or mixtures thereof.

The concentration of the optional catalyst used in the present invention may range generally from 0 wt % to about 20 wt %, preferably from about 0.01 wt % to about 20 wt %, more preferably from about 0.02 wt % to about 10 wt %, and most preferably from about 0.05 wt % to about 5 wt %.

In preparing the compositions of the present invention, in one embodiment, a monofunctional component may optionally be included in the composition. For example, the optional monofunctional component of the compositions of the present invention may include an epoxy resin different than the divinylarene dioxides described above. The optional epoxy resin used in the present formulation may include for example monoepoxides such as phenyl glycidyl ether, cresyl glycidyl ether, 2-ethylhexyl glycidyl ether, and dodecyl glycidyl ether; and mixtures thereof. The monofunctional component optionally used in the present invention may also include for example monophenols such as phenol, cresol, p.-t-butylphenol, nonylphenol, and pentadecylphenol; and mixtures thereof.

The concentration of the optional monofunctional component used in the present invention may range generally from 0 wt % to about 50 wt %, preferably from about 0 wt % to about 25 wt %, more preferably from about 0 wt % to about 10 wt %, and most preferably from about 0 wt % to about 5 wt %. In another embodiment the monofunctional component may be from about 0.01 wt % to about 50 wt %.

As an illustration of another embodiment of the present invention, one or more epoxy resins comprising those derived from diphenols such as bisphenol A or bisphenol F; halogenated bisphenols such as tetrabromobisphenol A; diphenols such as biphenol, thiodiphenol, and dinaphthol; and/or from alcohols such as butanediol or polypropylene glycol; or mixtures thereof, may be optionally included in the compositions of the present invention as co-monomers, post-reaction additives, or both.

The concentration of the optional epoxy resin component used in the present invention may range generally from 0 wt % to about 99 wt %, preferably from about 0 wt % to about 90 wt %, more preferably from about 0 wt % to about 75 wt %, and most preferably from about 0 wt % to about 50 wt %. In another embodiment the epoxy resin component may be from about 0.1 wt % to about 99 wt %.

In another embodiment, the composition of the present invention may include a polyfunctional component; wherein the polyfunctional component introduces branching without crosslinking. For example, the optional polyfunctional component may comprise a polyepoxide, a polyphenol, or mixtures thereof. More specifically, the polyphenols may be for example, a phenol novolac such as REZICURE 3000 (trademark of SI Group, Inc.) and the like; and the polyepoxides may be for example, an epoxy novolac such as D.E.N. 438 (trademark of The Dow Chemical Company) and the like. Branching without crosslinking is evident by the measurement of a finite melt viscosity and complete organic solvent solubility of the branched composition.

In still another embodiment of the present invention, one or more optional organic solvents comprising aromatics such as xylene, ketones such as methyl ether ketone, and alcohols such as 1-methoxy-2-propanol; and mixtures thereof, may be used in the present invention.

The concentration of the optional solvent used in the present invention may range generally from 0 wt % to about 95 wt %, preferably from about 0 wt % to about 80 wt %, more preferably from about 0 wt % to about 60 wt %, and most preferably from about 0 wt % to about 50 wt %. In another embodiment, the solvent can be from about 0.01 wt % to about 99 wt %.

An assortment of additives may be added to the compositions of the present invention including for example, other resins, stabilizers, fillers, plasticizers, catalyst de-activators, and the like; and mixtures thereof.

The concentration of the additives used in the present invention may range generally from 0 wt % to about 99.9 wt %, preferably from about 0.1 wt % to about 99.9 wt %, more preferably from about 1 wt % to about 99 wt %, and most preferably from about 2 wt % to about 98 wt %.

The preparation of the hydroxyl-functional polyether composition of the present invention is achieved by adding to a reactor: a divinylarene dioxide, a diphenol, optionally a catalyst, and optionally an inert organic solvent; and then allowing the components to react under reaction conditions to produce the hydroxyl-functional polyether. The reaction mixture of the present invention is prepared by mixing the components together. There is no criticality to the order of mixture. The above-mentioned optional assorted formulation additives such as stabilizers, plasticizers, and fillers may also be added to the product during the reaction or prior to recovery of the product.

In the reactor, the components are heated until the desired degree of reaction is achieved. Optionally a catalyst de-activator may be added to retard further reaction at any desired degree of conversion. The resulting product is allowed to cool prior to or during isolation and is immediately usable in thermoset or thermoplastic formulations.

The reaction conditions include carrying out the reaction under a temperature, generally in the range of from about 50° C. to about 300° C., preferably from about 75° C. to about 250° C., and more preferably from about 100° C. to about 200° C.

The pressure of the reaction may be from about 0.01 to about 100 preferably from about 0.1 to about 50, and more preferably from about 0.5 to about 10 bar.

The reaction process of the present invention may be a batch or a continuous. The reactor used in the process may be any reactor and ancillary equipment well known to those skilled in the art.

The novel hydroxyl-functional polyethers of the present invention, which are prepared from the divinylarene dioxides described above, have improved heat resistance at the same molecular weight or lower viscosity at the same heat resistance compared to known analogs. For example, D.E.H. 87 and D.E.H. 85 (trademark of The Dow Chemical Company) epoxy hardeners have moderate heat resistance and relatively high melt viscosity, as illustrated further below.

The viscosity of the hydroxyl-functional polyether prepared by the process of the present invention generally ranges from about 10 mPa-s to about 1000 mPa-s, preferably from about 15 mPa-s to about 750 mPa-s, and more preferably from about 20 mPa-s to about 500 mPa-s at 200° C.

The number average molecular weight of the hydroxyl-functional polyether prepared by the process of the present invention ranges generally from about 200 to about 100,000, preferably from about 200 to about 50,000, and more preferably from about 200 to about 25,000.

The heat resistance of the hydroxyl-functional polyether of the present invention ranges generally from about −50° C. to about 300° C., preferably from about 0° C. to about 250° C., and more preferably from about 50° C. to about 200° C. as measured by the glass transition temperature ($T_g$) using differential scanning calorimetry (DSC).

Compared to the hydroxyl-functional polyethers of the prior art, the compositions of the present invention have a higher concentration of pendant hydroxyl groups per non-aromatic ring atoms and thereby have a better balance of properties such as, barrier properties, adhesion, and heat resistance.

The hydroxyl-functional polyethers of the present invention are useful, as is, or as components in reactive formulations. For example, the hydroxyl-functional polyethers of the present invention are useful as reactive components in thermoset formulations; or as films and coatings. The primary use of the hydroxyl-functional polyethers of the present invention is as a component in epoxy thermoset formulations.

For example, in one embodiment, the PHEs of the present invention are useful as coatings, films, and foams and as additives in thermoplastic and thermoset formulations.

In another embodiment, the SERs of the present invention can be reacted with catalysts or comonomers which bear functional groups which react with either the terminal epoxide groups, the pendant hydroxyl groups, or both. Such catalysts include Lewis bases such as tertiary amines, Lewis acids such as boron trifluoride, and quaternary ammonium or phosphonium salts. Such comonomers include amines, phenols, sulfides, carboxylic acids and anhydrides, and phenolic resoles.

The novel SERs of the present invention can also be used, for example, as acid scavengers for halogenated polymers. For example, SERs can be added to polyvinyl chloride prior to melt processing to react with incipient HCl to form chlorohydrins and thereby reduce corrosion.

In still another embodiment, the PERs of the present invention can be reacted with comonomers which bear functional groups which react with either the terminal phenolic groups, the pendant hydroxyl groups, or both. Such comonomers include epoxides, esters, anhydrides, and phenolic resoles.

EXAMPLES

The following examples and comparative examples further illustrate the present invention in detail but are not to be construed to limit the scope thereof.

Various terms and designations used in the following examples are explained herein below:

A-1 catalyst is an ethyltriphenylphosphonium acetate-acetic acid complex, 70 wt. % in methanol; and commercially available from Morton International.

DVBDO stands for divinylbenzene dioxide.
PER stands for phenolic epoxy resin.
DSC stands for differential scanning calorimetry.
$T_g$ stands for glass transition temperature.
GPC stands for gel permeation chromatography.
$M_n$ stands for number average molecular weight.
$M_w$ stands for weight average molecular weight.
$\eta^*$ (150° C.) stands for complex viscosity measured at 150° C.

The following standard analytical equipments and methods are used in the Examples:

$T_g$ is measured by DSC using a temperature sweep rate of 10° C./minute.

GPC is measured using a Viscotek liquid chromatography system fitted with refractive index, right angle laser light scattering, and differential pressure detectors.

Complex viscosity is measured using an ARES rheometer fitted with a parallel plate fixture and operating at a frequency of 10 s$^{-1}$.

Examples 1-3 and Comparative Examples A and B

PERs from DVBDO and Bisphenol A

To a reactor were added the amounts of reagents listed in Table I. The mixture was heated with stirring from about 90° C. to about 200° C. over 3 hours to complete the reaction and then cooled to room temperature (about 25° C.). Table I also includes the results of the properties measured by the methods described above.

TABLE I

PERs from DVBDO and Bisphenol A.

| Example | DVBDO (g) | BA (g) | A-1 (g) | $T_g$ (°C.) | $\eta^*$ (150° C.) (mPa-s) | GPC-LS $M_n$ (daltons) | $M_w$ (daltons) | Polydispersity (Mw/Mn) |
|---|---|---|---|---|---|---|---|---|
| 1 | 9.0 | 20.0 | 0.03 | 81 | 9,230 | 987 | 3,930 | 3.9 |
| 2 | 8.1 | 20.0 | 0.04 | 70 | 2,950 | 773 | 2,450 | 3.2 |
| 3 | 5.9 | 20.0 | 0.03 | 52 | 462 | 587 | 1,260 | 2.1 |
| Comp. A: D.E.H. 87 | | | | 50 | 1,331 | 865 | 1,870 | 2.1 |
| Comp. B. D.E.H. 85 | | | | 40 | 607 | 623 | 1,252 | 2.1 |

The results in Table I illustrate the advantage of the compositions of the present invention over those of the prior art. For instance, Example 3 has a $T_g$ similar to that of D.E.H. 87 epoxy hardener but its melt viscosity is >3 times lower.

It will be obvious to persons skilled in the art that certain changes may be made in the methods described above without departing from the scope of the present invention. It is therefore intended that all matter herein disclosed be interpreted as illustrative only and not as limiting the scope of protection sought. Moreover, the process of the present invention is not to be limited by the specific examples set forth above including the tables to which they refer. Rather, these examples and the tables they refer to are illustrative of the process of the present invention.

What is claimed is:

1. A soluble reactive intermediate hydroxyl-functional polyether having phenolic functionalities composition comprising the reaction product of (a) a divinylarene dioxide and (b) a diphenol, wherein the diphenol is used in stoichiometric excess; wherein the ratio in terms of epoxy to phenolic equivalents is less than 0.99; forming a soluble reactive intermediate having phenolic functionalities; wherein said reactive intermediate has a melt viscosity in the range of from about 10 mPa-s to about 1,000 mPa-s at 200° C. and the viscosity of said reactive intermediate is less than that of a bisphenol A-bisphenol A diglycidyl ether analog having the same glass transition temperature as that of said reactive intermediate.

2. The composition of claim 1, wherein the divinylarene dioxide is divinylbenzene dioxide.

3. The composition of claim 1, wherein the diphenol is selected from the group comprising bisphenol A, bisphenol F, tetrabromobisphenol A, biphenol, thiodiphenol, dinaphthol; and mixtures thereof.

4. The composition of claim 1 admixed in a thermoplastic or a thermoset formulation.

5. The composition of claim 1 including a monofunctional component; wherein the monofunctional component is a monoepoxide or a monophenol.

6. The composition of claim 1 including a polyfunctional component; wherein the polyfunctional component introduces branching without crosslinking.

7. The composition of claim 6, wherein the polyfunctional component comprises a polyepoxide, a polyphenol, or mixtures thereof.

8. The composition of claim 7, wherein the polyepoxide comprises an epoxy novolac; or wherein the polyphenol comprises a phenol novolac.

* * * * *